(12) United States Patent
Dow et al.

(10) Patent No.: US 7,104,253 B1
(45) Date of Patent: Sep. 12, 2006

(54) STRATIFIED SCAVENGING CARBURETOR

(75) Inventors: Paul J. Dow, Cass City, MI (US);
David D. Hacker, Bad Axe, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 0 days.

(21) Appl. No.: 11/093,357

(22) Filed: Mar. 30, 2005

(51) Int. Cl.
*F02D 9/02* (2006.01)

(52) U.S. Cl. .................. 123/342; 123/73 A; 123/337; 261/39.2; 261/41.2

(58) Field of Classification Search ............... 123/342, 123/73 A, 73 B, 442, 336, 337, 339.12; 261/39.2–39.4, 41.2, 41.5, 44.3–44.6
See application file for complete search history.

(56) References Cited

U.S. PATENT DOCUMENTS

| | | | |
|---|---|---|---|
| 2,325,010 A | 7/1943 | McCurdy | |
| 2,941,788 A | 6/1960 | Braun | |
| 3,174,469 A | 3/1965 | Rappolt | |
| 3,439,658 A | 4/1969 | Simonet | |
| 3,759,232 A | 9/1973 | Wahl et al | |
| 3,967,600 A | 7/1976 | Iiyama et al. | |
| 4,060,062 A | 11/1977 | Tsutsui et al. | |
| 4,073,278 A | 2/1978 | Glenn | |
| 4,075,985 A | 2/1978 | Iwai | |
| 4,094,931 A | 6/1978 | Karino | |
| 4,182,295 A | 1/1980 | Zeller et al. | |
| 4,200,083 A | 4/1980 | Ishida | |
| 4,256,063 A | 3/1981 | Sumiyoshi et al. | |
| 4,294,205 A | 10/1981 | Iiyama et al. | |
| 4,333,429 A | 6/1982 | Iiyama et al. | |
| 4,414,162 A | 11/1983 | Ii et al. | |
| 4,445,474 A | 5/1984 | Nakao et al. | |
| 4,452,218 A | 6/1984 | Yokoyama et al. | |
| 4,796,579 A | 1/1989 | Wolfe et al. | |
| 4,995,370 A | 2/1991 | Imaeda et al. | |
| 5,036,816 A | 8/1991 | Mann | |
| 5,088,468 A | 2/1992 | Imaeda | |
| 5,165,298 A * | 11/1992 | Shier et al. ................ 74/502.6 |
| 5,200,118 A | 4/1993 | Hermle | |
| 5,611,312 A | 3/1997 | Swanson et al. | |
| 6,000,683 A | 12/1999 | Van Allen | |
| 6,112,708 A | 9/2000 | Sawada et al. | |
| 6,135,072 A | 10/2000 | Kishita | |
| 6,202,989 B1 | 3/2001 | Pattullo | |
| 6,216,650 B1 | 4/2001 | Noguchi | |
| 6,257,179 B1 | 7/2001 | Uenoyama et al. | |
| 6,298,811 B1 | 10/2001 | Sawada et al. | |
| 6,328,288 B1 | 12/2001 | Gerhardy | |

(Continued)

FOREIGN PATENT DOCUMENTS

DE 342274 10/1921

(Continued)

*Primary Examiner*—Willis R. Wolfe
*Assistant Examiner*—Johnny H. Hoang
(74) *Attorney, Agent, or Firm*—Reising, Ethington, Barnes, Kisselle, P.C.

(57) ABSTRACT

In one presently preferred embodiment a stratified scavenging carburetor has a scavenging air passage with an air control valve and a fuel and air mixing passage with a throttle control valve, and a lost motion coupling associated with the valves to delay opening of the closed air valve until the throttle valve has partially opened from its idle position to an off idle position and preferably thereafter to open the air valve in phased relationship with the throttle valve so that the valves become wide open at substantially the same time. Preferably the coupling has reels associated with the valve and connected by a flexible cord.

26 Claims, 3 Drawing Sheets

U.S. PATENT DOCUMENTS

| | | |
|---|---|---|
| 6,347,787 B1 | 2/2002 | Tobinai et al. |
| 6,349,925 B1 | 2/2002 | Tobinai et al. |
| 6,354,251 B1 | 3/2002 | Toda |
| 6,418,891 B1 | 7/2002 | Kobayashi |
| 6,439,547 B1 | 8/2002 | King et al. |
| 6,450,135 B1 | 9/2002 | Araki |
| 6,591,794 B1 | 7/2003 | Toda |
| 6,708,958 B1 | 3/2004 | Warfel et al. |
| 6,749,180 B1 | 6/2004 | Durr et al. |
| 6,769,396 B1 | 8/2004 | Geyer et al. |
| 6,843,469 B1 * | 1/2005 | Nonaka .................. 261/44.3 |
| 6,896,245 B1 | 5/2005 | Suzuki et al. |
| 2002/0043227 A1 | 4/2002 | Carlsson et al. |
| 2003/0011081 A1 | 1/2003 | Martinsson et al. |
| 2003/0213464 A1 | 11/2003 | Geyer et al. |
| 2005/0155573 A1 * | 7/2005 | McLeod .................. 123/376 |

FOREIGN PATENT DOCUMENTS

| | | |
|---|---|---|
| DE | 432953 | 8/1926 |
| DE | 2909637 | 12/1979 |
| DE | 3722424 | 1/1988 |
| EP | 0651142 A2 | 5/1995 |
| JP | 52006835 | 1/1977 |
| JP | 57183520 | 11/1982 |
| JP | 58005424 | 1/1983 |
| JP | 9125966 | 5/1997 |
| JP | 9268917 | 10/1997 |
| JP | 9268918 | 10/1997 |
| JP | 9287521 | 11/1997 |
| JP | 2000-186560 | 7/2000 |
| JP | 2001-186559 | 7/2000 |

* cited by examiner

STRATIFIED SCAVENGING CARBURETOR

FIELD OF THE INVENTION

The present invention relates generally to a carburetor and more particularly to a stratified scavenging carburetor for controlling delivery of a fuel and air mixture and scavenging air to an engine.

BACKGROUND OF THE INVENTION

In a 2-stroke engine, stratified scavenging arrangements have been used to reduce or prevent the blow-through or loss of fuel through exhaust ports at the time of a fuel and air mixture entering the combustion chamber. Some such arrangements use an air passage that is separate from a fuel and air mixture passage, and scavenging is done with a layer of air provided from the air passage at the outset of scavenging, after which scavenging is done with a fuel and air mixture, and at the same time, new air is taken into a crankcase chamber.

In this stratified scavenging arrangement, the fuel to air mixture ratio within a combustion chamber of the engine can become too lean with the addition of air from the air passage at idle and other low speed and low load engine operating conditions resulting in unstable engine operation under these conditions. Further, for improved cold starting and warming up of the engine, it can be desirable to provide a somewhat rich fuel and air mixture to the engine. Scavenging air flow through the air passage at this time can make the fuel and air mixture leaner than desired resulting in difficulty in starting and warming up the engine.

SUMMARY OF THE INVENTION

In one presently preferred embodiment a stratified scavenging carburetor includes a carburetor body having a scavenging air passage and a separate fuel and air mixing passage formed therein. An air valve is disposed in communication with the scavenging air passage and is moveable between closed and open positions to control air flow through the scavenging air passage. A throttle valve is disposed in communication with the fuel and air mixing passage and is moveable between an idle position at least substantially restricting fluid flow through the fuel and air mixing passage and an open position permitting an at least somewhat less restricted fluid flow therethrough. A lost motion coupler is operably associated with the valves to control the opening of the air valve as a function of the opening of the throttle valve. Preferably the lost motion coupler is carried by either the air valve or the throttle valve and is operably connected with the other valve by a flexible cord.

With the lost motion coupling, when the throttle valve is in its idle position the air valve is closed. When the throttle valve is opened a limited amount away from its idle position to an off idle position the cord drives the lost motion coupler for movement relative to the air valve in a limited range and the air valve remains closed. Further movement of the throttle valve away from its off idle position and toward its wide open position drives the lost motion coupler which moves the air valve from its closed position toward its open position. In this manner, the air valve remains closed at engine idle and at least some off idle range of low speed and low load engine operation to facilitate engine operation under these conditions.

Preferably, when the throttle valve is in its wide open position the air valve is fully open. Where the throttle valve and air valve are rotated among their positions, this can be accomplished, by way of example and without limitation, by connecting the cord to the throttle valve and to the lost motion coupler at different distances from the axis of rotation of the throttle valve and air valve, respectively. When connected at different distances from the axes of rotation of the throttle and air valves, the valves will rotate at different angular velocities or rates to achieve the desired movement of each valve.

Some potential objects, features and advantages that can be achieved by at least some embodiments of stratified scavenging carburetors as set forth herein include providing a carburetor that delivers to an engine a desired fuel and air mixture over a wide range of operating conditions from idle to wide open throttle engine operation, and starting and warming up of an engine; provides an enriched fuel and air mixture to an engine to facilitate starting the engine; provides a compact carburetor that includes a scavenging air passage, air valve, choke valve and throttle valve; controls air valve movement as a function of throttle valve movement; prevents scavenging air flow at idle and off idle low speed/low load engine operating conditions; enables relative movement between the throttle valve and air valve during at least a portion of the throttle valve movement; and is rugged, durable, reliable, of economic manufacture and assembly, and relatively simple design and in service has a long useful life.

BRIEF DESCRIPTION OF THE DRAWINGS

These and other objects, features and advantages of the present invention will be apparent from the following detailed description of the preferred embodiments and best mode, appended claims and accompanying drawings in which:

DETAILED DESCRIPTION OF THE PREFERRED EMBODIMENTS

Figure 1:
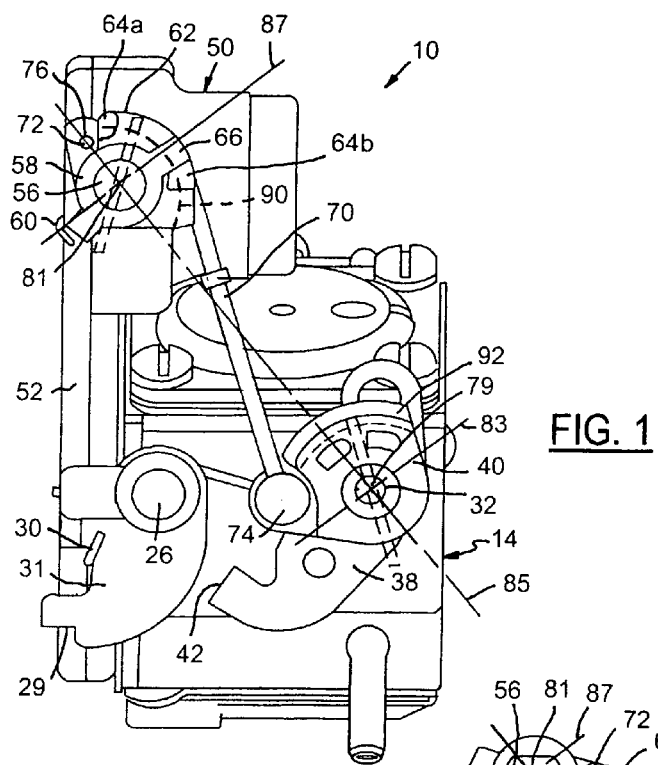
FIG. 1 is a perspective side view of one presently preferred embodiment of a stratified scavenging carburetor with a throttle valve in its idle position.

Referring in more detail to the drawings, FIGS. 1–9 illustrate one presently preferred embodiment of a carburetor 10 that includes a fuel and air mixing passage 12 (FIGS. 4–6) and a scavenging air passage 16 extending through a body 14. A fuel and air mixture is supplied from the mixing passage 12 to an engine to support engine operation and scavenging air is supplied from the air passage 16 to the engine. The carburetor 10 preferably is a diaphragm-type carburetor having a fuel pump diaphragm (not shown) to help move fuel into and through the carburetor and a fuel metering diaphragm (not shown) that preferably is atmospheric referenced and controls the availability of fuel to the fuel and air mixing passage 12. Diaphragm-type carburetors of this general operating scheme are known, and U.S. Pat. No. 6,688,585 which is incorporated herein by reference in its entirety, is one example. A throttle valve 18 is disposed in the mixing passage 12 to control fluid flow therethrough and an air valve 20 is disposed in the air passage to control air flow therethrough. The air valve 20 is operably associated with the throttle valve 18 to control the relative movement of the valves and accordingly, the fluid flow through the scavenging air passage 16 and the fuel and air mixing passage 12.

The carburetor 10 preferably has a choke valve 22 disposed at least in part in the mixing passage 12. The choke valve 22 includes a choke valve head 24 rotatably supported on a choke valve shaft 26 for rotation between open and closed positions. The choke valve 22 preferably is a butterfly-type valve and the choke valve head 24 preferably is a thin, flat plate shaped complementarily to the adjacent portion of the mixing passage 12, or otherwise, as desired for a particular application. In its open position the choke valve 22 permits a relatively unrestricted flow of air therethrough, and in its closed position the choke valve 22 permits a restricted flow of air therethrough. A choke valve operating lever 28 (FIG. 3) is connected to one end of the choke valve shaft 26 and actuates a fast idle lever 31 that preferably has a notch 29 therein. A return spring 30 that yieldably biases the choke valve 22 to its open position is wound on the choke valve shaft 26. One end of the return spring 30 is fastened to or abuts a throttle valve shaft 32 and the other end of the return spring 30 is fastened to or abuts the fast idle lever 31. The ends of the spring 30 could be arranged to engage the carburetor body 14 and choke valve, 22 or otherwise as desired.

Figure 3:
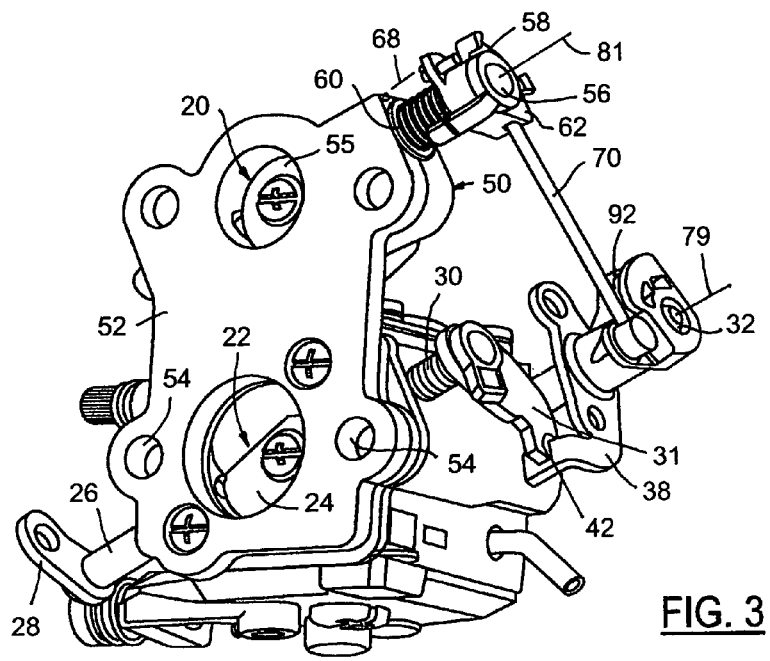
FIG. 3 is a perspective view of the carburetor showing the position of the throttle valve, a choke valve and an air valve for a choke assisted start of an engine with which the carburetor is used.

The throttle valve 18 preferably also is a butterfly-type valve and has a thin, flat valve head 34 carried by a throttle valve shaft 32 that extends through and is rotatably carried by the carburetor body 14. A throttle valve lever 38 is fixed to one end of the throttle valve shaft 32 for rotation in unison therewith and, as best shown in FIG. 3, preferably includes a shoulder 42 adapted to cooperate with the notch 29 of the fast idle lever 31 during starting of a cold engine to move the throttle valve 18 away from its idle position to a so-called "fast idle" starting position when the choke valve 22 is moved to its closed position. The notch 29 and shoulder 42 engagement preferably also holds the choke valve 22 in its closed position against the force of the return spring 30. The throttle valve lever 38 may be formed as one piece or more than one piece. A return spring (not shown) yieldably biases the throttle valve 18 to its idle position and is wound on the throttle valve shaft 32. One end of the return spring is fastened to or abuts the carburetor body 14 and the other end of the return spring is fastened to or abuts the throttle valve lever 38. In its idle position, the throttle valve 18 substantially restricts fluid flow through the mixing passage 12, and in its wide open position, the throttle valve 18 permits a substantially unrestricted fuel flow through the mixing passage 12.

A scavenging air body 50 for supplying scavenging air from an air cleaner or filter (not shown) to a scavenging passage of the engine via the air passage 16 is preferably formed as part of or is carried by a mounting plate 52 secured to and defining part of the carburetor body 14. The mounting plate 52 may include one or more holes 54 through which screws are received to mount the carburetor 10 to an engine. The air passage 16 preferably is approximately parallel to the fuel and air mixing passage 12, and is provided at least in part in the scavenging air body 50. The air valve 20 includes a valve head 55 which may be a thin, flat plate that is carried by an air valve shaft 56 that is in turn rotatably carried by the carburetor body 14, and in the described embodiment, is carried by the scavenging air body 50. The air valve 20 is moveable from an open position permitting a substantially unrestricted flow of air through the air passage 16 and a closed position restricting air flow through the air passage 16. An air valve link 58 is fixed to one end of the air valve shaft 56 for rotation therewith, as shown in FIG. 1, and a return spring 60 that yieldably biases the air valve 20 toward its closed position is wound on the air valve shaft 56. One end of the return spring 60 is fastened to or abuts the scavenging air body 50 and the other end of the return spring 60 is fastened to or abuts the air valve link 58.

The air valve is operably connected to the throttle valve by a lost motion coupler with a reel 62 cooperating with link 58, a reel 40 fixed to the throttle valve shaft for rotation therewith and a cord 70 connected to the reels. Reel 40 may be either separate from or preferably formed as an integral part of throttle lever 38. The reel 62 is rotatably carried by the air valve shaft 56 for movement relative to the air valve link 58 and air valve shaft 56 over a predetermined range, and beyond that range of movement, the reel 66 and air valve 20 move together in unison providing a lost motion coupling between the reel 62 and air valve 20. The lost motion coupler preferably is defined at least in part by the reel 62 that is rotatable relative to the air valve shaft 56, at least one tab 64 on the reel 62 and a finger 66 on the air valve link 58 and adapted to engage the tab 64. A spring 68 preferably is engaged with the reel 62 to yieldably bias the reel 62 to a first position as schematically shown in FIG. 3. The reel 62 could rotate freely without any spring acting directly thereon.

In one presently preferred embodiment, the cord 70 is connected to and in operation winds and unwinds on the reels 40 and 62. The cord 70 may be of any suitable material, shape and length and preferably is flexible and substantially inextensible in use. As shown, in one preferred embodiment each end 72, 74 of the cord 70 includes a tapered head 76 leading to a radially enlarged annular barb 78. The head 76 of each end 72, 74 is constructed to be press-fit through a corresponding opening in the reels 40 and 62 with the barb 78 overlying the opening to inhibit or prevent removal of the heads 76 of the cord 70 from the reels 40 and 62.

As shown in FIG. 1, the cord 70 may be wrapped partially about the reel 62 preferably in an arcuate groove or track 90 when the throttle valve 18 is in its idle position, and may be unwrapped as the reel 62 rotates in response to rotation of the throttle valve 18. As the throttle valve 18 rotates toward its wide open position, the cord 70 may become increasingly wrapped around the reel 40 preferably in an arcuate groove or track 92 which moves or displaces the cord 70 to rotate the reel 62 when tab 64a engages finger 66 to rotate the air valve 20. In this manner, a portion or portions of the cord 70 between its ends may engage reels 40, 62 to control displacement of the cord 70 and hence, rotation of the air valve 20. The reels 40, 62, and any track carried by the reels, can be contoured as desired to control the rate at which the cord 70 is taken up and/or let out to control the rate of rotation of the air valve 20.

Figure 4:
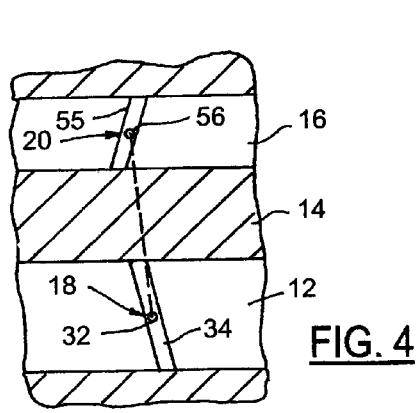
FIG. 4 is a schematic view showing the throttle valve in its idle position and the air valve in its closed position.
Figure 6:
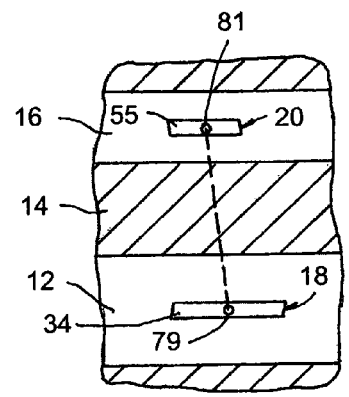
FIG. 6 is a schematic view showing the throttle valve in its wide open position and the air valve in its fully open position.
Figure 5:
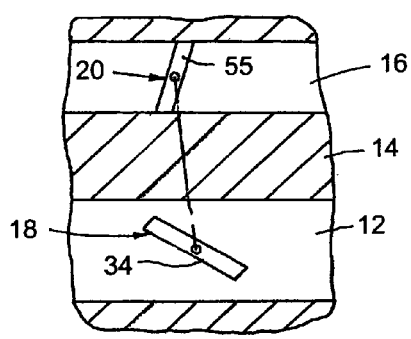
FIG. 5 is a schematic view showing the throttle valve moved away from its idle position to an off idle position and the air valve in its closed position.
Figure 7:
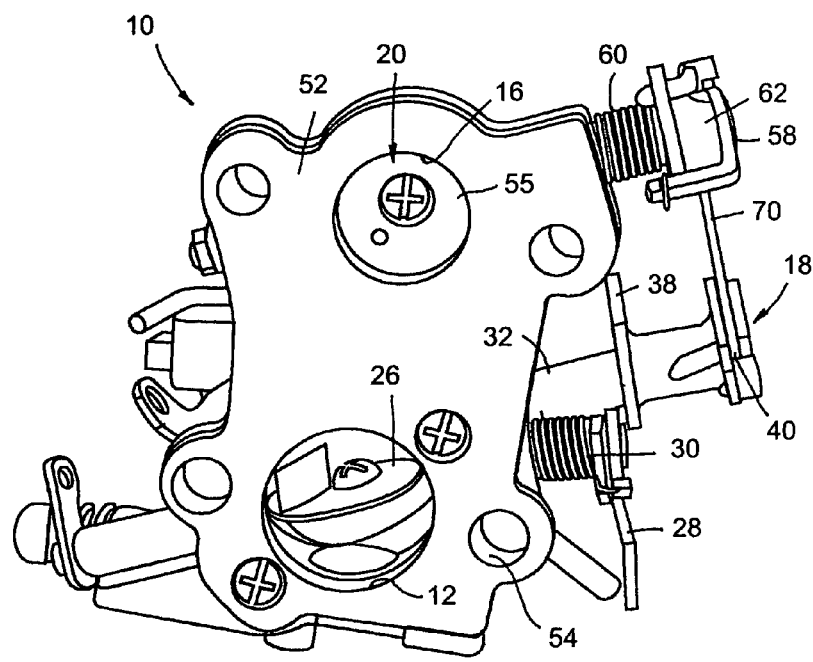
FIG. 7 is a front view of the carburetor.
Figure 8:
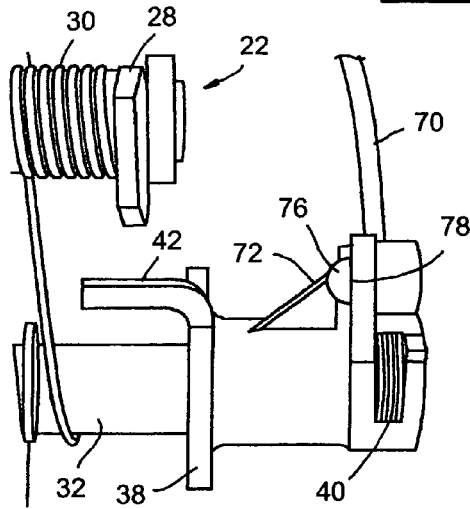
FIG. 8 is an enlarged fragmentary perspective view showing the connection of a cord to the throttle valve.
Figure 9:
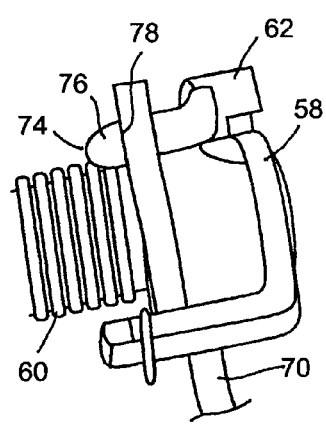
FIG. 9 is an enlarged fragmentary perspective view showing the connection of the cord to a lost motion coupler carried by the air valve.

As best shown in FIG. 4, when the throttle valve 18 is in its idle position the air valve 20 is closed. Movement of the throttle valve 18 away from its idle position causes a corresponding movement of the reel 62 to selectively move the air valve 20 as a function of the position of the throttle valve 18. As shown in FIG. 5, through this lost motion coupling, the air valve 20 is held in its closed position (by the force of spring 60) while the throttle valve head 34 is rotated a predetermined amount from its idle position toward its wide open position. During this rotation of the throttle valve 18, the reel 62 is rotated relative to the air valve shaft 56 and air valve link 58. When the throttle valve 18 is rotated beyond the predetermined amount, a tab 64a on the reel 62 is engaged with the finger 66 on the air valve link 58 so that further rotation of the reel 62 causes the air valve 20 to rotate with the reel 62 and away from its closed position and in phased relationship with further opening of the throttle valve 18. As shown in FIG. 6, when the throttle valve 18 is rotated to its wide open position, the air valve 20 is preferably rotated (via the cord 70 and reel 62) to its fully open position.

The cord 70 preferably is flexible and generally only rotates the air valve 20 when sufficiently in tension by pulling on the reel 62. Therefore, when the throttle valve 18 rotates back toward its idle position, the tension in the cord 70 is reduced or eliminated and the force of the spring 60 acting on the air valve lever 58 rotates the air valve 20 back toward its closed position. The reel 62 is returned to its first position shown in FIG. 1 by the spring 68, if such a spring is provided. The reel 62 preferably includes a second tab 64b spaced from the first tab 64a and adapted to engage the finger 66 when the reel 62 is rotated back to its first position to limit rotation of the reel 62 and its unwinding of the cord 70 preferably so that the cord is in slight tension. With the cord 70 in tension, the actuation of the throttle valve 18 is smoother since rotation of the reel 62 then requires overcoming a continuously applied spring force. If the initial rotation of the reel 62 occurred without any opposing spring force and then a spring force where suddenly encountered when the air valve is rotated, the suddenly increased force needed to rotate the reel 62 and air valve could be somewhat more noticeable during actuation of the throttle valve 18.

In the preferred embodiment, both the air valve 20 and throttle valve 18 rotate approximately 70 to 90 degrees and preferably about 75° from their closed and idle positions to their fully and wide open positions. Preferably, the air valve 20 and throttle valve 18 rotate about the same number of degrees between their closed or idle and fully open positions. Since the air valve 20 is closed during a first portion of the throttle valve movement, the air valve 20 must rotate at a faster rate than the throttle valve 18 during at least a portion of the air valve 20 rotation so that the valves 18, 20 reach their fully and wide open positions at generally the same time. This can be controlled, for example, by connecting the cord to reel 40 and reel 62 at different radial distances from the axis of rotation 79 of the throttle valve shaft 32 and air valve shaft 56, respectively. For example, the cord 70 can be attached to the reel 40 at a first radial distance from the axis of rotation 81 of the throttle valve shaft 32, and the cord 70 can be attached to the reel 62 at a second radial distance from the axis of rotation of the air valve shaft 56. In one presently preferred embodiment, the first radial distance is greater than the second radial distance so that when the air valve 20 rotates, it does so at a faster rate than the throttle valve 18.

Figure 2:
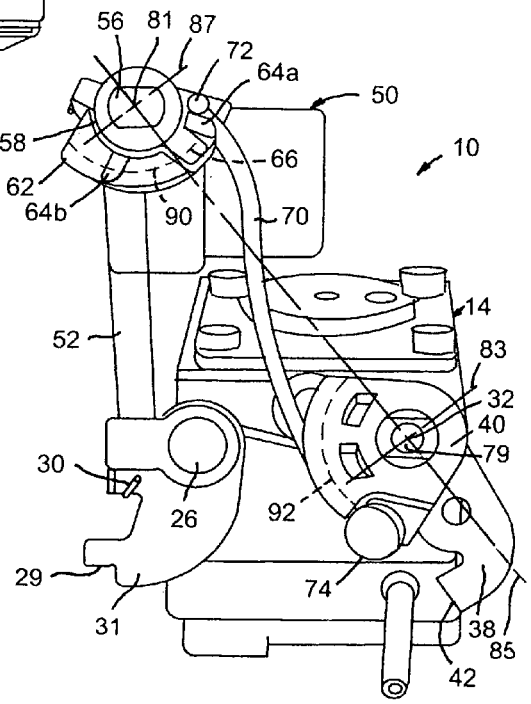
FIG. 2 is a perspective side view of the stratified scavenging carburetor with the throttle valve in its wide open position.

Also or in addition, the location of the point of attachment of the cord 70 to the throttle valve reel 40 relative to the air valve axis can be varied to change the distance that that point of attachment travels away from the air valve axis 81, and thereby vary for a given amount of throttle valve rotation the amount of rotation of the air valve 20. Of course, the point of attachment of the cord 70 to the reel 62 may also be varied. The timing and rate of rotation of the air valve 20 during the rotation of the throttle valve 18 can also be controlled in this manner. In one presently preferred embodiment, as best shown in FIGS. 1 and 2, the end 74 or point of connection of the cord 70 to the throttle valve 18 is moved through a plane 83 that contains the throttle valve axis 79 and is perpendicular to a plane 85 containing the axes 79, 81 of the air valve 20 and throttle valve 18, respectively. Preferably, the point of connection of the cord 70 to the throttle valve 18 may move from about 20 to 60 degrees on one side of the plane 83 to 20 to 60 degrees on the other side of plane 83 (measured generally from the center of the end 74 of the cord 70) as the throttle valve 18 moves from its idle position to its wide open position. The end 72 or point of connection of the cord 70 to the air valve reel 62 may likewise be moved through another plane 87 that contains the axis 81 of the air valve 20 and is perpendicular to the plane 85 containing the axes 79, 81 of the throttle valve 18 and air valve 20, respectively. Preferably, the end 72 or point of connection of the cord 70 to the air valve 20 may move from about 90 to 45 degrees on one side of the plane 87 to 20 to 60 degrees on the other side of plane 87 (measured generally from the center of the end 72 of the cord 70) as the air valve 20 moves from its closed position to its open position. In the embodiment shown, the throttle valve 18 and the air valve 20 rotate in opposite directions, and the cord 70 intersects the plane 85 containing the axes of rotation of the air and throttle valves, preferably when the throttle valve 18 is in both its idle and wide open positions. Further, the length of the cord 70 can be varied, for example, so that initial rotation of the throttle valve 18 takes up slack in the cord 70 before the air valve 20 is rotated away from its closed position to provide or increase the extent of a lost motion coupling between them.

The desired extent of the lost motion coupling between the throttle valve 18 and the air valve 20 can be different depending on the engine or application. Generally, it is desirable to permit the throttle valve 18 to move away from its idle position a certain amount to a partially open off idle position while maintaining the air valve 20 closed to prevent supplying too much air and hence, an undesirably lean fuel and air mixture to the engine during certain low speed and/or low power engine operating conditions. In one presently preferred embodiment, the air valve 20 is held in its closed position until the throttle valve 18 is rotated about 10° to 40°, and in one embodiment about 30° open away from its idle position to a partially open off idle position of the throttle valve 18. With further opening rotation of the throttle valve 18 from its off idle position, the air valve 20 opens to provide air through the air passage 16 to the engine.

As shown in FIG. 3, to perform a cold start of the engine, preferably the choke valve 22 is moved to its fully closed position. This causes the fast idle lever 31 to engage the throttle valve lever 38 and preferably at least slightly move the throttle valve 18 away from its idle position to a slightly open starting position. The choke valve 22 is held in its closed position by engagement of the notch 29 and shoulder 42 on the throttle valve lever 38. The air valve 20 is held in its closed position by the force of the spring 60, since the throttle valve 18 has not been rotated far enough to cause the cord 70 to rotate the reel 62 sufficiently to move the air valve 20. In this state, when the engine is cranked and started, a suitable quantity of fuel in a rich fuel and air mixture is supplied to the engine since the choke valve 22 and the air valve 20 are closed, as shown in FIG. 3, and the throttle valve 18 is opened a desired amount away from its idle position. The rich fuel and air mixture facilitates starting and warming up the engine. When the engine is warmed-up and the throttle valve 18 is rotated toward wide open throttle to increase the engine speed and/or power, as shown in FIG. 4, the fast idle lever 31 is released from the throttle valve lever 38, and the choke valve 22 is returned to its fully open position by the force of the spring 30.

The flexible cord 70 provides a smooth transition from rotation of only the throttle valve 18 to rotation of both the throttle and air valves 18, 20. The movement of the air valve 20 is not controlled by a gap between and/or engagement of rigid levers that frictionally slide or cam relative to one another during movement of the valves 18, 20. Rather, the cord 70 relative smoothly rotates the reel 62 of the lost motion coupler in engagement with the air valve link 58, and thereafter smoothly rotates the air valve 20 toward its open position. Further, the cord 70, which may be plastic, metal or any other suitable material, can be relatively inexpensive and is durable in that it preferably does not encounter substantially sliding frictional engagement with other components.

The invention claimed is:

1. A carburetor, including:
   a scavenging air passage and a fuel and air mixing passage;
   a throttle valve disposed in communication with the fuel and air mixing passage and movable between an idle position at least substantially restricting fluid flow through the fuel and air mixing passage and an open position permitting an at least somewhat less restricted fluid flow therethrough;
   an air valve disposed in communication with the scavenging air passage and movable between closed and open positions to control air flow through the scavenging air passage;
   a lost motion coupler operably associated with the valves, movable over a limited range relative to the air valve, and movable with the air valve outside of the limited range; and
   a flexible cord operably connecting the throttle valve and air valve through the lost motion coupler to drive the opening of the air valve in response to movement of the throttle valve toward its open position, wherein the air valve is closed when the throttle valve is in its idle position, when the throttle valve is moved a limited amount away from its idle position toward a partially open off idle position the cord drives the lost motion coupler and in said limited range the air valve remains closed, and further movement of the throttle valve away from its off idle position drives the lost motion coupler which moves the air valve from its closed position toward its open position.

2. The carburetor of claim 1 wherein the lost motion coupler includes a reel carried by the air valve and rotatable relative to the air valve in said limited range.

3. The carburetor of claim 2 wherein the cord is wrapped around at least a portion of the periphery of the reel in at least one position of the reel.

4. The carburetor of claim 3 wherein the throttle valve includes a shaft that rotates about an axis and a lever carried by the shaft, and the cord is attached to the lever at a location spaced from the axis of rotation of the throttle valve shaft.

5. The carburetor of claim 2 wherein the air valve includes a shaft that rotates about an axis to move the air valve between its closed and open positions, and the reel is carried by the air valve shaft and rotates about the axis of the air valve shaft.

6. The carburetor of claim 1 wherein the throttle valve includes a shaft that rotates about an axis and a lever carried by the shaft and connected to the cord at a first distance from the axis of the throttle valve shaft, and the air valve includes a shaft that rotates about an axis with the lost motion coupler carried by the air valve shaft, and wherein the cord is attached to the lost motion coupler at a second distance from the air valve shaft axis and said first distance is greater than said second distance.

7. The carburetor of claim 1 wherein the throttle valve includes a lever having a reel portion and the cord is attached to the lever so that during at least a portion of the rotation of the throttle valve a portion of the cord between its ends engages the reel portion of the lever.

8. The carburetor of claim 7 wherein the reel is contoured to control the rate at which the cord is taken up by the reel as the throttle valve is moved from its idle toward its wide open position.

9. The carburetor of claim 1 wherein the air valve includes a shaft that rotates about an axis and the throttle valve includes a shaft that rotates about an axis and the cord intersects a plane containing the axes of both the air valve shaft and the throttle valve shaft.

10. The carburetor of claim 9 wherein the air valve rotates in one direction from its closed to its open position and the throttle valve rotates in the opposite direction from its idle to its wide open position.

11. The carburetor of claim 1 wherein the air valve includes a shaft that rotates about an axis, the throttle valve includes a shaft that rotates about an axis and the cord is connected to the throttle valve at a location that, when the throttle valve is moved from its idle position to its wide open position, passes through a plane that contains the axis of the throttle valve shaft and is perpendicular to a plane containing the axes of both the air valve shaft and the throttle valve shaft.

12. The carburetor of claim 1 wherein the air valve includes a shaft that rotates about an axis, the throttle valve includes a shaft that rotates about an axis and the cord is connected to the air valve at a location that, when the air valve is moved from its closed position to its open position, passes through a plane that contains the axis of the air valve shaft and is perpendicular to a plane containing the axes of both the air valve shaft and the throttle valve shaft.

13. The carburetor of claim 1 wherein the cord is polymeric.

14. The carburetor of claim 13 wherein the cord is attached to the reel by a press-fit.

15. The carburetor of claim 1 wherein the throttle valve includes a lever and the cord is attached to the lever by a press-fit.

16. The carburetor of claim 1 wherein the lost motion coupler is yieldably biased toward a first position corresponding to the idle position of the throttle valve.

17. The carburetor of claim 16 which also includes a spring that yieldably biases the lost motion coupler and said spring maintains the cord in tension when the lost motion coupler is in its first position.

18. The carburetor of claim 1 wherein the air valve moves at a faster rate than the throttle valve during at least a portion of the movement of the throttle valve.

19. The carburetor of claim 1 wherein the operable connection of the cord with one of the valves comprises a lever connected with the one valve for rotation in unison therewith and the cord adjacent one of its ends is connected with the lever at a generally radial distance from the axis of rotation of the one valve.

20. A carburetor, including:
a scavenging air passage and a fuel and air mixing passage;
a throttle valve disposed in communication with the fuel and air mixing passage; and movable between an idle position at least substantially restricting fluid flow through the fuel and air mixing passage and an open position permitting an at least somewhat less restricted fluid flow therethrough;
an air valve disposed in communication with the scavenging air passage and movable between closed and open positions to control air flow through the scavenging air passage;
a lost motion coupler operably associated with the valves, movable over a limited range relative to the air valve, causing movement of the air valve when moved outside of the limited range, and including a flexible cord that operably connects the air valve and throttle valve and causes rotation of the air valve when the throttle valve is rotated sufficiently to move the lost motion coupler outside of said limited range so that the air valve is closed when the throttle valve is in its idle position, when the throttle valve is moved a limited amount away from its idle position toward a partially open off idle position the cord drives the lost motion coupler and in said limited range the air valve remains closed, and further movement of the throttle valve away from its off idle position drives the lost motion coupler which moves the air valve from its closed position toward its open position.

21. The carburetor of claim 20 wherein the lost motion coupler includes a reel carried by one of the throttle valve and the air valve for rotation in a limited range relative to the valve that carries it to provide at least a portion of the limited range of movement of the throttle valve relative to the air valve.

22. A carburetor comprising:
a scavenging air passage;
an air valve disposed in the scavenging air passage and rotatable between closed and open positions to control air flow through the scavenging air passage;
a fuel-and-air mixing passage;
a throttle valve in the fuel-and-air mixing passage and rotatable between an idle position at least substantially restricting fluid flow through the fuel-and-air mixing passage, and a wide open position permitting less restricted fluid flow through the fuel-and-air mixing passages; and
a lost motion coupler having a flexible cord operably connected adjacent one end with the throttle valve and operably connected adjacent the other end with the air valve and configured so that the cord is slack when the air valve is in its closed position and simultaneously the throttle valve is in its idle position and as the throttle valve is rotated away from its idle position to a partially open off-idle position, the slack in the cord is taken up while the air valve still remains in its closed position and as the throttle valve is rotated from its partially open off-idle position to its wide open position, the cord is placed in tension and rotates the air valve from its closed position to its open position.

23. The carburetor of claim 22 which also comprises a spring yieldably biasing the air valve toward its closed position.

24. The carburetor of claim 22 wherein at least one of the operable connections of the flexible cord comprises a reel about which the cord wraps and unwraps at least as the air valve is rotated by the lost motion coupler and also comprises a spring yieldably biasing the air valve toward its closed position.

25. The carburetor of claim 22 wherein the operable connection of the cord with the throttle valve comprises a first lever connected with the throttle valve for rotation in unison therewith and adjacent one of its ends, the cord is connected to the first lever at a first generally radial distance from the axis of rotation of the throttle valve, and the operable connection of the cord with the air valve comprises a second lever connected with the air valve for rotation in unison therewith, and the cord adjacent its other end is operably connected to the second lever at a generally radial second distance from the axis of rotation of the air valve.

26. The carburetor of claim 25 wherein the first radius is not equal to the second radius.

* * * * *